Oct. 6, 1970   C. B. SLOOP ET AL   3,532,348
TEACHING DEVICE

Filed Dec. 23, 1968   2 Sheets-Sheet 1

INVENTORS
CONRAD B. SLOOP
JOHN W. RYAN

BY Max E. Shirk
ATTORNEY

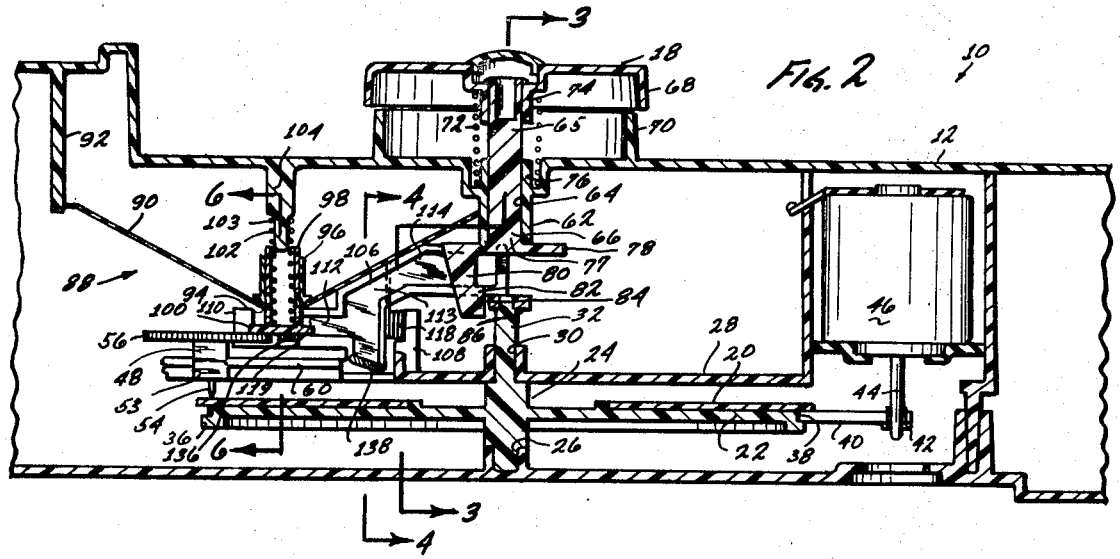
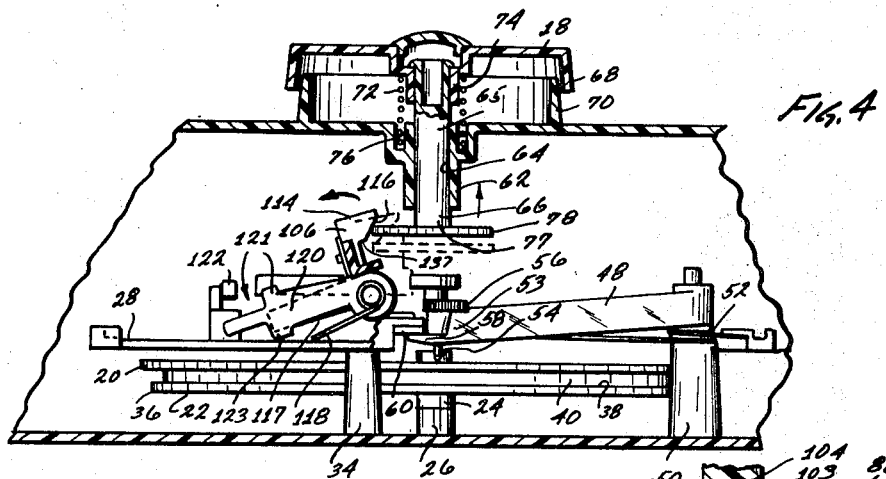
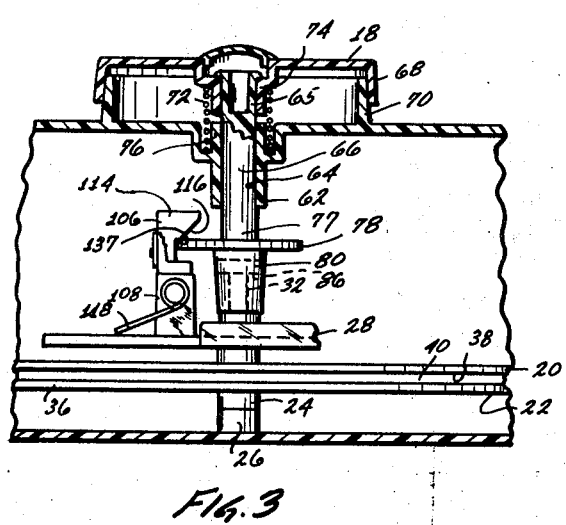
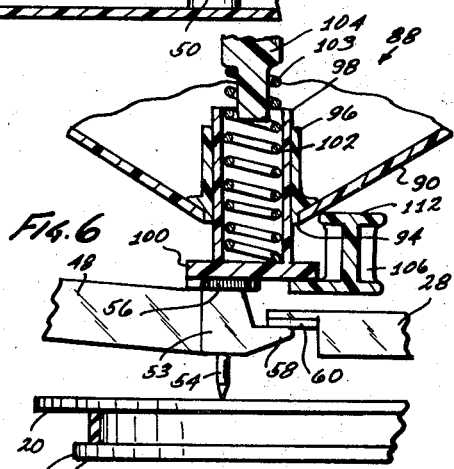

United States Patent Office 3,532,348
Patented Oct. 6, 1970

3,532,348
TEACHING DEVICE
Conrad B. Sloop, Huntington Beach, and John W. Ryan, Los Angeles, Calif., assignors to Mattel, Inc., Hawthorne, Calif., a corporation of Delaware
Filed Dec. 23, 1968, Ser. No. 785,942
Int. Cl. G11b 7/06
U.S. Cl. 274—15        13 Claims

ABSTRACT OF THE DISCLOSURE

An electrically operated teaching device having a phonograph record containing a plurality of sound tracks in interleaved grooves selectively playable in response to a rotatable conditioning means which, when depressed, energizes the motor to drive the record after a needle has been positioned on the selected groove. At the end of the selected groove the conditioning means is released, the motor is deenergized, the speaker cone is lifted and the needle is returned to its original position.

BACKGROUND OF THE INVENTION

The background of the invention is set forth in two parts.

Field of the invention

The present invention relates to a new and useful teaching device and more particularly to a new and useful electrically-operated teaching device having sound reproducing means which may be conditioned by a user of the device to reproduce predetermined segments of recorded information, related to a subject about which the user wishes to be informed. The reproducing means may conveniently comprise a multiple speech phonograph device generally of the type disclosed in Pat. No. 3,017,187 which is used in combination with means for teaching the user of the device useful information about particular subjects selected by the user. Such a mechanically operated teaching means is shown and described in Pat. No. 3,383,114.

Description of the prior art

Pat. No. 3,383,114 discloses a teaching machine having a multiple track record with spiral, interleaved grooves, each containing a different message or sound. Each groove commences adjacent the periphery of the record. The teaching machine contains a dial on the outside surface of the housing which has a circular segmented indicator means thereon. The dial is rotated to a particular segment bearing indicia. A drawstring connected to the sound reproducing means is then pulled to bias the record for rotation and position a needle to reproduce the sound on the groove.

It is accordingly an object of this invention to provide a new and improved teaching device utilizing a multiple groove record.

It is another object of this invention to provide a new and improved teaching device which is electrically operated.

It is a further object of this invention to provide a new and improved electrically operated teaching device operable in response to the depression of a prepositioned dial used to select the information to be reproduced.

It is another object of this invention to provide a new and improved electrically operated teaching device having means for lifting the speaker cone out of engagement with the tone arm after a traversal of one groove to permit the tone arm to return to its original position.

SUMMARY OF THE INVENTION

The foregoing and other objects of the invention are accomplished by providing a teaching device having a housing with a multiple groove phonograph record rotatably mounted therein. The record has segments of recorded information with a separate lead-in groove adjacent the outer periphery of the record for each segment. A dial pointer is rotated to a desired position and is keyed to rotate the record and place the coresponding lead-in groove in position with respect to a tone arm which bears the phonograph needle and coacts with sound reproducing means including a speaker cone. The dial is then depressed to actuate an operating arm which latches the dial in the depressed condition and selected position while simultaneously releasing the keying mechanism to permit rotation of the record and dropping the tone arm so that its needle contacts a predetermined lead-in groove. A motor is then energized to drive the record. At the end of the groove, a portion of the tone arm contacts the operating arm to release the dial, key the dial to the record turntable, deenergize the motor, lift the speaker cone out of engagement with the tone arm and permit the tone arm to return to its original position for another operation.

BRIEF DESCRIPTION OF THE DRAWINGS

Further objects, features and advantages of the invention will be pointed out with particularity in the following description when taken in conjunction with the drawings in which:

FIG. 2 is an enlarged, partial, cross-sectional view taken along line 2—2 of FIG. 1;

FIG. 3 is a partial cross-sectional view taken along line 3—3 of FIG. 2;

FIG. 4 is a partial cross-sectional view taken along line 4—4 of FIG. 2;

FIG. 6 is an enlarged, partial cross-sectional view taken along line 6—6 of FIG. 2.

DESCRIPTION OF THE PREFERRED EMBODIMENT

Figure 1:
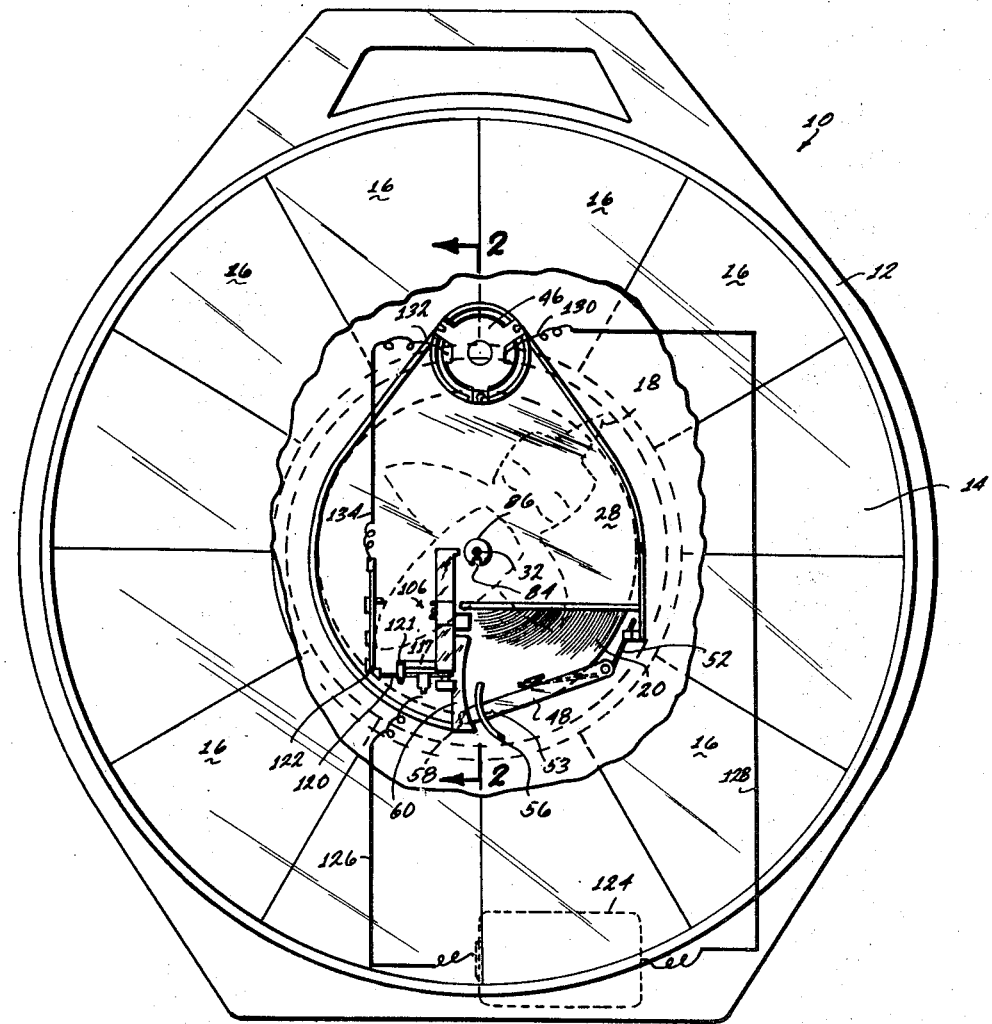
FIG. 1 is a plan view of the teaching device according to the invention with the housing partially broken away to show interior parts thereof.

Referring now to the drawings and particularly to FIG. 1 there is shown a teaching device, generally designated 10, which includes a housing 12 having a circular face 14 divided into arcuate segments 16. A dial pointer 18 (shown in dotted lines in the form of a bee) is centrally rotatably mounted on the housing 12 to select the particular segment 16 which bears indicia representative of information on a particular subject. A multigroove phonograph record 20 of the type shown and described in Pat. No. 3,017,187 is rotatably mounted within housing 10, as will hereinafter be described. The indicia within segments 16 and the relationship to the record grooves is fully shown and described in the aforementiond Pat. No. 3,383,114. Briefly, the number of spiral interleaved grooves on the record 20 correspond to the number of segments 16 on the face 14 of the housing 12 with each groove beginning at the periphery of the record 20.

The record is secured to a circular turntable 22 (FIG. 2) which has a central hub portion 24 positioned in a bearing 26 formed in the lower portion of housing 12. A main support frame 28 has an aperture 30 therein for receiving axle 32 of hub portion 24 to permit rotation of turntable 22 with respect to the housing 12 and support frame 28 which is suitably secured thereto by means of suitable spacers, like the one shown at 34 in FIG. 4.

The turntable 22 has a lip 36 formed about the periphery thereof and the record 20 overlaps the turntable 22 thereby resulting in a groove 38 which engages an endless belt 40. The belt 40 also engages a drive pulley 42 secured to shaft 44 of an electric motor 46 affixed to support frame 28.

Figure 5:
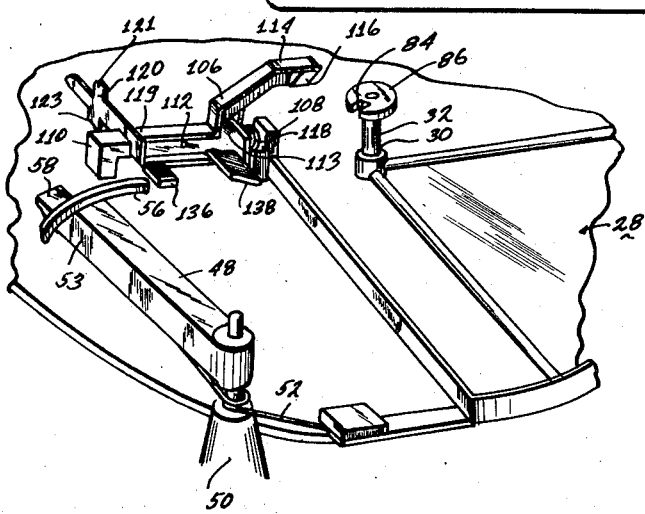
FIG. 5 is a perspective view of the interior of the teaching device of FIG. 1 with parts thereof removed to show details of the operating arm.

Referring now to FIGS. 1 and 5, the support frame 28 has a portion thereof so configured as to expose a portion of record 20. A tone arm 48 is pivotally secured to a boss 50 on the lower part of housing 12 to permit tone arm 48 to swing radially over record 20. The tone arm 48 is normally biased to the periphery of record 20 by means of a hinge spring 52. Spring 52 also exerts an upward force for reasons which will hereinafter become obvious. The free end 53 of tone arm 48 has a phonograph needle 54 (FIG. 2) affixed to the underside thereof for engaging the grooves of the record 20. Disposed opposite the needle 54 on the upper side of end 53 is a transversely extending arcuate rib 56 secured to tone arm 48. An axially extending guide member 58 may be provided on free end 53 of tone arm 48. A shelf or projection 60 is formed on support frame 28 in the path of travel of guide member 58 which moves along a spaced distance beneath shelf 60 during the playing of record 20 and slideably engages shelf 60 during the return of tone arm 48 to the periphery of record 20 at the end of play. Member 58 is biased upwardly by spring 52 during this return to insure that needle 54 will not scuff record 20.

As seen in FIG. 2 the upper part of housing 12 has a centrally located hub portion 62 provided with an aperture 64 therein through which is inserted a shaft 66 for rotatable and axial movement. The dial pointer 18 is secured to one end 65 of shaft 66 extending out from housing 12. The dial pointer 18 is provided with a downwardly extending outwardly tapering skirt 68. Concentric therewith is an upwardly extending inwardly tapering skirt 70 formed in housing 12, both skirts being configured for the outer periphery of skirt 70 to engage the inner periphery of skirt 68 when the dial pointer 18 is depressed. Dial pointer 18 is normally biased upwardly by a coil spring 72 encircling shaft 66 between a hub 74 on the under surface of dial pointer 18 and a hub 76 formed about aperture 64 opposite hub 62.

The other end 77 of shaft 66 is provided with a disc 78 integral therewith, the disc 78 having a downwardly-depending generally L-shaped blade member 80 with short leg 82 thereof being keyed in a slot 84 in a second axially aligned disc 86 secured to the upper end of axle 32 of the turntable 22. The short leg 82 is so configured to engage slot 84 only when the dial pointer 18 is in its normal, upwardly-biased position, thus permitting the turntable 22 to be keyed for rotation with dial pointer 18 during selection of the desired indicium.

On the underside of the upper part of housing 12 is a speaker assembly 88 which includes a speaker cone 90 secured, as by adhesive, to a skirt 92 (FIG. 2). At the apex 94 of speaker cone 90 is an aperture through which is secured a cylinder 96 having a piston 98 slideably positioned therein. The piston 98 is provided with an enlarged disc portion 100 which slidingly abuts arcuate transversely-extending member 56 of tone arm 48. The piston 98 is biased downwardly by means of coil spring 102 positioned therein and having an end 103 engaging downwardly extending pin 104 axially aligned with piston 98.

An operating arm 106 (FIGS. 2, 5 and 6) is secured to support frame 28 for limited pivotal movement about an axis transverse to and offset from the axis of rotation of record 20 in proximity to the path of movement of needle 54 on tone arm 48. Spaced, upwardly-extending projections 108 and 110 on support frame 28, have pivot beam 112 (FIG. 5) of operating arm 106 interposed therebetween and secured thereto by suitable hinge pins (not shown). Extending upwardly and inwardly from one end 113 of pivot beam 112 is a latching arm 114 having a radially extending cam surface 116 (FIG. 4) engaging the circumference of disc 78 of shaft 66 on a radius of shaft 66. Operating arm 106 is biased by a hinge spring 118 to urge cam surface 116 into engagement with disc 78.

Integral with the other end 119 (FIG. 4) of pivot beam 112 is a contact arm 117 extending generally transversely to the axis of rotation of pivot beam 112. Slideably abutting contact arm 117 is a movable electrical contact member 120 disposed for limited pivotal movement about the same axis. The contact member 120 is provided with spaced generally parallel upper and lower tabs, 121 and 123 respectively. The tabs 121 and 123 are spaced apart more than the width of contact arm 117 and are adapted for contacting the sides of the free end of contact arm 117 after a predetermined pivotal movement thereof to provide a certain amount of lost motion for reasons which will hereinafter become obvious. In proximity to movable contact member 120 a fixed contact member 122 is secured to support frame 28 (FIG. 4).

As shown in FIG. 1 a normally open electrical circuit is provided from one end of a battery 124 through conductor 126 to movable contact member 120 and from the other end of battery 124 through conductor to one terminal 130 of motor 46 through the other terminal 132 through conductor 134 to fixed contact member 122.

One end 119 of the pivot beam 112 is provided with a toe 136 (see FIGS. 2, 5 and 6) extending generally parallel to and in proximity with the underside of enlarged disc portion 100 of piston 98. Adjacent projection 108 the pivot beam 112 is provided with a release cam 138 having the cam surface thereof disposed to coact with transversely extending guide member 58 of tone arm 48 at the end of travel of one operational cycle.

OPERATION OF THE TEACHING DEVICE

The various structural portions of the teaching device have been described but a detailed operational cycle will now be described to show the novel interrelationships. Initially the dial pointer 18 along with its shaft 66 is biased upwardly (see FIG. 2) with the disc 78 at the lower end of shaft 66 urging against cam surface 116 to urge operating arm 106 against the biasing force of its hinge spring 118 (see FIG. 4). Contact arm 117 and consequently movable electrical contact 120 is urged counterclockwise (as viewed in FIG. 4) out of engagement with fixed contact 122. Toe 136 of pivot beam 112 urges disc portion 100 of piston 98 upwardly. Tone arm 48 is biased to the outer periphery of record 20 by hinge spring 52. Hinge spring 52 also urges tone arm 48 upwardly so that needle 54 does not contact record 20. The downwardly depending blade member 80 of disc 78 has the short leg 82 keyed to slot 84 of disc 86 secured to axle 32 of turntable 22.

As the pointer 18 is rotated to a given segment 16 on the face 14, the turntable 22 is rotated by short leg 82 coacting with slot 84 of disc 86 to position the groove bearing sound recordings corresponding to the indicia of the selected segment 16. This groove is positioned with respect to needle 54 of tone arm 48.

Dial pointer 18 is then depressed (FIGS. 3 and 4). Downward movement of pointer 18 disengages short leg 82 from slot 84 of disc 86 to permit turntable 22 to rotate. Operating arm 106 is pivoting clockwise (as viewed in FIG. 4) as is toe 136 secured to pivot beam 112 to allow piston to lower under the force of spring 102. The enlarged disc portion 100 of piston 98 urges against member 56 of tone arm 48 until needle 54 contacts the groove of record 20.

During the rotation thus far of operating arm 106 contact arm 117 is sliding along contact member 120. As contact arm 117 rotates further it engages upper tab 121 to thereby rotate contact member 120 into engagement with fixed contact 122 to complete the previously described circuit to start record 20 rotating. The operating arm 106 is then locked in position by engagement of detent 137 at the bottom of cam surface 116, with the upper surface of disc 78 of shaft 66. The inner surface of skirt 68 of pointer 18 frictionally engages the outer surface of skirt 70 to assist detent 137 and disc 78 in retaining the pointer 18 in its depressed and indicated position during the cycle.

Vibrations from the groove are transmitted through needle 54 through arcuate member 56 through the enlarged disc portion 100 of piston 98 to thereby drive the piston 98 and produce sound from speaker cone 90. As the tone arm 48 traverses its path arcuate member 56 is in abutting sliding relation with enlarged disc portion 100 of piston 98.

When tone arm 48 traverses the grooves, guide member 58 secured to the free end 53 thereof engages release cam 138 thereby urging operating arm 106 counterclockwise as viewed in FIG. 4. Sequentially the following things happen: disc 78 of shaft 66 is released from detent 137 of cam surface 116 to urge dial pointer 18 toward its normal condition by the force of its biasing spring 72; the upper edge of short leg 82 engages the lower surface of disc 78 thereby preventing upward movement of pointer 18; toe 136 of pivot beam 112 urges upwardly against enlarged disc portion 100 of piston 98 to thereby permit tone arm 48 to raise by the upward bias force of spring 52; this causes needle 54 to raise out of the groove of record 20 and tone arm 48 is restored to its original position by the outwardly biasing force of spring 52; due to the lost motion in contact arm 117, contact member 120 has not yet moved and record 20 continues to rotate until short leg 82 is aligned with slot 84 of disc 78; operating arm 106 then continues its counterclockwise rotation as disc 78 urges against cam surface 116; contact arm 117 then engages lower tab 123 of contact member 120 to carry contact member 120 with it out of electrical engagement with fixed contact 122 to deenergize the previously described circuit.

Thus, it can be seen that the lost motion in the switch arrangement permits the needle 54 to contact the selected groove prior to energizing motor 46 to rotate record 20 and at the completion of the cycle permits rotation of record 20 until short leg 82 again engages slot 84 of disc 78 after the tone arm 48 has been restored to its original position.

While there has been shown and described a preferred embodiment of the invention it is to be understood that various adaptations and modifications may be made without departing from the spirit and scope of the invention and no limitations are intended by the details of construction and design herein shown and described other than as defined in the appended claims.

What is claimed is:
1. In a teaching device, the combination comprising:
   (a) housing means;
   (b) a phonograph record rotatably mounted in said housing means, said record having recorded thereon a plurality of sound sequences containing educational information to be taught to a user of said device, said record comprising a disc record, each of said sound sequences being recorded in a separate spiral groove, said spiral grooves being interleaved on said record with the beginning of each sound sequence being adjacent the outer periphery of said record;
   (c) driving means connected to said record for rotating said record;
   (d) sound reproducing means engageable with said record for reproducing said sound sequences when said record is rotated, said sound reproducing means including a tone arm pivotally secured to said housing, said tone arm having a needle at the free end thereof for traversing the grooves of said record;
   (e) manually controlled means operable between a first and a second position, said manually controlled means positioning said record at the beginning of a predetermined sound sequence when in said first position, said manually controlled means actuating said driving means when in said second position whereby said predetermined sound sequence may be reproduced; and
   (f) other means responsive to the traversal of said tone arm in the groove of said predetermined sound sequence for restoring said manually operable means to said first position.

2. The combination according to claim 1 wherein said driving means includes an electric motor and said manually operable means in said second position completes a circuit to a power source to energize said motor.

3. The combination according to claim 1 wherein said manually operable means includes a dial pointer normally biased to said first position, said dial pointer being rotatably mounted on said housing by a shaft having keying means, said phonograph record being mounted on a turntable having means engageable with said keying means when said dial pointer is in said first position, said keying means being disengaged when said dial pointer is depressed to its second position.

4. The combination according to claim 1 wherein said sound reproducing means include a speaker cone having a piston at the apex thereof, said tone arm including a transversely extending member slideably engaging said piston during the traversal of said tone arm for transmitting sonic vibrations from said groove to said speaker cone.

5. The combination according to claim 4 wherein said piston is axially movable and biased into contact with said transversely extending member.

6. The combination according to claim 5 wherein said tone arm is normally biased away from the surface of said record and to the periphery of said record, said manually operable means in said second position permitting said piston to urge the needle of said tone arm into said groove.

7. The combination according to claim 6 wherein said other means includes means for engaging said piston to urge it against its bias whereby said tone arm is lifted from the surface of said record and restored to the periphery of said record.

8. The combination according to claim 3 wherein said other means includes an operating arm actuable by a disc secured to said shaft of said dial pointer, said operating arm having a first portion engaging said disc to retain said dial pointer in its second position, said operating arm having a second portion engageable with said tone arm during its transversal to disengage said disc from said first portion to return said dial pointer to said first position.

9. The combination according to claim 3 wherein indicia means are mounted on said housing means for providing a visual representation of said sound sequences and said dial pointer indicates the indicia representative of said predetermined sound sequence.

10. The combination according to claim 3 wherein said driving means includes an electric motor and switch means, said dial pointer in said second position actuating said switch means to complete a circuit only after said needle is in the groove of said predetermined sound sequence, said switch means deenergizing said circuit only after said keying means is engaged.

11. In a teaching machine toy including recorded message carrier means having recorded thereon a plurality of sound sequences containing educational information to be taught to a user of said toy, driving means connected to said recorded message carrier means for driving said recorded message carrier means and sound reproducing means engageable with said recorded message carrier means for reproducing said sound sequences when said recorded message carrier means is driven, the improvement comprising:
   manually controlled means operable between a first and a second position, said manually controlled means positioning said recorded message carrier means and said sound reproducing means relative to each other at the beginning of a predetermined sound sequence when in one of said positions, said manually controlled means actuating said driving means when in the other of said positions, whereby said predetermined sound sequence may be reproduced; and other means responsive to the traversal of said sound reproducing means on said recorded message carrier means during reproduction of said predetermined sound sequence for restoring said manually operable means to said one position.

12. The improvement according to claim 11 wherein said driving means includes an electric motor and wherein said manually operable means includes means for completing a circuit to said motor when said manually operable means is in said other position.

13. The improvement according to claim 11 wherein said manually operable means includes a dial pointer normally biased to said one position, said dial pointer being rotatably mounted in said toy by a shaft having keying means, said recorded message carrier means being mounted on a rotatable turntable having means engageable with said keying means when said dial pointer is in said one position, said keying means being disengaged when said dial pointer is in said other position.

References Cited
UNITED STATES PATENTS

| | | | |
|---|---|---|---|
| 3,017,187 | 1/1962 | Ryan | 274—1.1 X |
| 3,211,460 | 10/1965 | Lea | 274—1.1 X |
| 3,383,114 | 5/1968 | Ryan | 274—2 |

HARRY N. HAROIAN, Primary Examiner

U.SS. Cl. X.R.

274—9